Oct. 25, 1966  R. WATTS, JR  3,280,428
HEATING MECHANISM
Filed April 30, 1963

INVENTOR.
RIDLEY WATTS, jr.
BY Watts & Fisher
Attorneys

United States Patent Office 3,280,428
Patented Oct. 25, 1966

---

3,280,428
HEATING MECHANISM
Ridley Watts, Jr., Cleveland, Ohio, assignor to
The American Packaging Corporation
Filed Apr. 30, 1963, Ser. No. 276,935
8 Claims. (Cl. 18—19)

This invention relates generally to heating mechanisms, and more specifically to a new and improved heating mechanism for selectively transmitting heat energy.

The present invention is particularly concerned with an improved heat source. The invention is especially suited for package forming apparatus which may be used to produce unit display packages of the type disclosed in U.S. Patent No. 3,053,023. The package disclosed in that patent combines the advantages of skin, blister, and shrink packaging and in its preferred form consists generally of a foldover display card having mating product-receiving apertures in each half of the card. The product is positioned within the apertures of the double-face card so that it is snugly gripped peripherally and is covered completely by a protective pocket of plastic film, such as polyethylene. With this arrangement, the product may selectively project from and be visible from either one or both faces of the finished package.

In forming the display package described above, the polyethylene film is preferably adhered to the back of the card over the product-receiving apertures and the card positioned on a mold or die so that each of the apertures are over a mold cavity. These cavities are each shaped to define a portion of the contour of the product to be packaged. The plastic film is heat softened either before or after the card has been positioned over the mold. After the card has been positioned and the film heated, portions of the film are then brought through the card apertures against the surfaces of the mold cavities. The portions of the film brought against the surfaces of the mold cavities form pockets with together define a chamber which has the contour of the product to be packaged. After the pockets have been formed, the card is folded so that the pockets cooperatingly define the contoured chamber and then the product is inserted in the chamber and the card halves secured together in any suitable manner.

When polyethylene and similar plastic films are heated and then allowed to cool, the plastic tends to shrink. Since the film is adhered to the card, this shrinkage will curl the card and destroy the package unless special precautions are taken in heating the plastic.

With some types of plastic film the application of heat will cause disintegration of the plastic unless the heated area is supported. Because of this characteristic, there are many instances in manufacturing operations involving partially supported plastic film in which the use of a shaped heat source to heat only a selected area is highly desirable. A so-called shaped heat source is especially desirable in the manufacture of that class of package described in the patent referenced above because of this tendency of films to disintegrate and also because of the "card curl" problem described above. One type of shaped heat source is described in co-pending application Serial No. 213,803, filed July 31, 1962, now Patent No. 3,217,-462, under the title Method and Apparatus for Making Packages. The present invention is directed to an improved apparatus for producing a shaped heat source.

In manufacturing processes involving the heating of selected areas of plastic, the shape of the area to be heated will vary from time to time. For example, in packages of the class which have been discussed above, a pocket of the package is contoured to the shape of the object to be packaged. As indicated, it is desirable only to heat that pocket. Accordingly, the shape of the area to be heated in a package for one product will be different than the shape in packages for other products. The present invention accommodates these variations through the provision of a heat source that may be quickly and readily shaped to the contour of any area to be heated so as to provide heat only where it is needed.

A general object object of the invention is, then, to provide a shaped heat source in which the source has the contour of an area to be heated.

A more specific object of the present invention is to provide an effective heat source for heating the film in a package in such a manner that "card curl" is prevented. More particularly, it is an object of the invention to provide a heat source which will heat the plastic film only in its pocket-forming areas.

Since the plastic is heated only in its pocket-forming areas, the film is cool in the areas which are adhered to the card. That is, there is no tendency materially to stretch or shrink the plastic in a manner that would cause the plastic to demonstrate a memory and shrink to another size. By avoiding this memory characteristic, card curl is completely eliminated.

Another advantage of the invention is that the heating operation is highly efficient and economical. As will hereinafter be made more apparent, heat is developed by the heat source only in figured areas which correspond to the areas of the film from which the pockets are formed. This efficient operation is accomplished by providing a heat source which develops and transmits radiant energy in a manner that delineates the pocket shaping cavities of the mold.

Other objects and advantages of the invention will become apparent from the following detailed description when taken in conjunction with the accompanying drawings.

Figure 1:
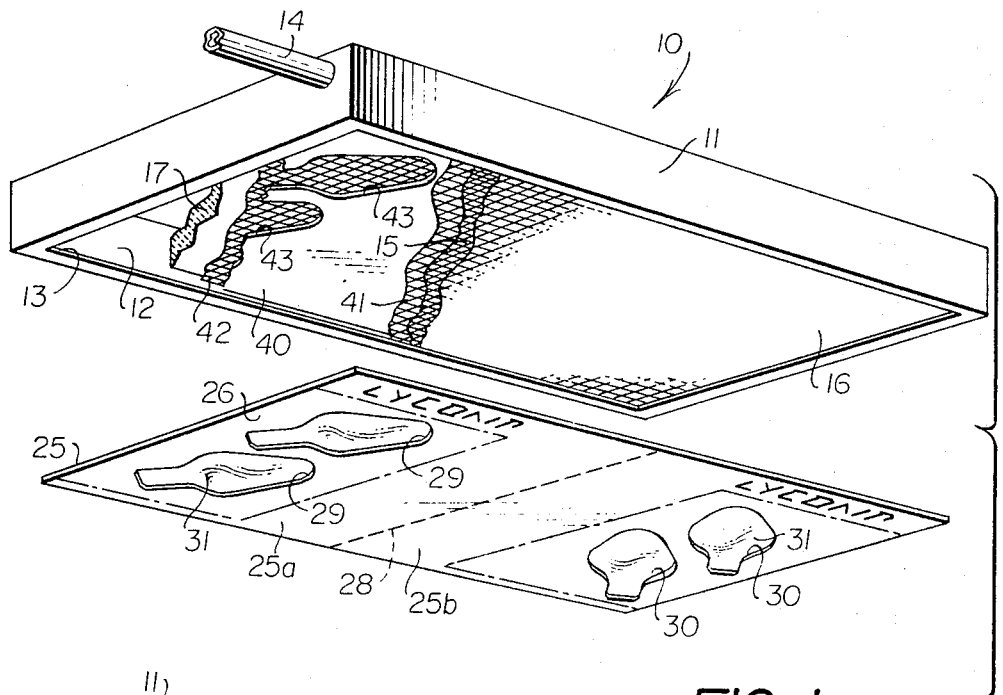
FIGURE 1 is a perspective view, with portions broken away, illustrating the heating mechanism of the invention operatively positioned over a display card.
Figure 2:
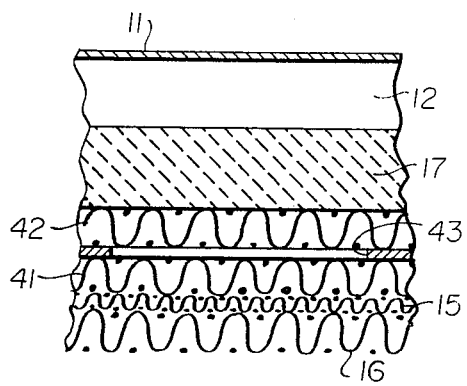
FIGURE 2 is a fragmentary, greatly enlarged view of the heating mechanism.

Referring now to the drawings, the radiant heating mechanism comprising the invention is generally designated by reference numeral 10. The heating mechanism 10 is a catalytic, infra-red heater designed to operate on fuel gas, such as propane or butane fuel gas, and to convert the gaseous fuel energy to infra-red energy on the surface of a catalytically active screen. The heater 10 operates below the flammable temperature of the fuel gas in a range of from about 750° F. to about 1300° F., depending on the air-gas fuel mixture.

As shown, the heater 10 comprises a housing 11 which defines a gas manifold 12. The housing 11 has a wall opening 13 and is provided with a fuel inlet 14 through which the fuel gas mixture is introduced into the manifold 12. The fuel gas mixture is introduced into the manifold by means of an oxidization air blower (not shown) and a suitable gas/air mixer (also not shown).

A sheet of catalytically active material 15, which may be a platinum screen or gauze, is mounted on the housing 11 over the opening 13. The screen or gauze is shown as being protected by a coextensive outer screen 16. A fuel diffusing medium 17 formed of a gas permeable, ceramic material also is shown as being mounted in the housing between the manifold 12 and the catalytically active screen 15. This diffusing medium 17 provides a slight resistance to gas flow which is advantageous in attaining good fuel distribution at low operating flow rates, and also pre-heats the fuel mixture when the heater has been placed in operation. If desired, however, the material 17 can be eliminated from the assembly because of the provision of a novel fuel masking member hereinafter described.

As generally discussed above, the heating mechanism of this invention is particularly useful as a heat source in apparatus for forming unit display packages. In order to illustrate this preferred use, there is shown a typical supporting and display card 25 for an article to be packaged. The card 25 has a printed and decorated outer face 26 and an opposite inner face or back 27 which may be scored or perforated along the line 28 to define card halves 25a and 25b. The card half 25a is cut to provide one or more apertures 29 which mate with corresponding apertures 30 in the opposite half 25b when the card is folded on the line 28. These apertures 29 and 30 are shaped to conform with the outline of the product to be packaged.

Figure 3:
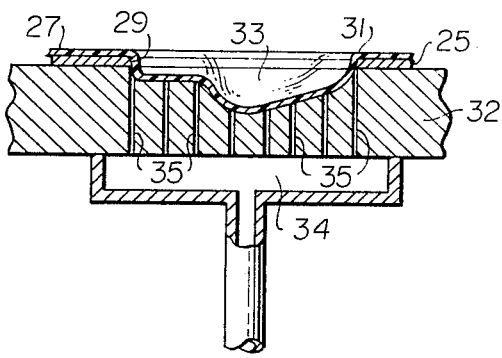
FIGURE 3 is a fragmentary view illustrating a display card operatively positioned on a typical mold.

A sheet of polyethylene film 31 is mounted on the back face 27 of the card over the apertures 29 and 30. Preferably, the plastic film 31 is at least partially bonded to the card by a suitable adhesive, such as a solvent base, thermosensitive lacquer. As shown in FIG. 3, the film may be brought through the apertures to form product-receiving pockets by means of a mold 32. The mold 32 has product-contoured cavities 33 (only one of which is shown) over which each of the apertures 29 and 30 may be positioned. A vacuum manifold 34 communicates with the cavities 33 through passages 35.

In accordance with the invention, a heat-resistant mask 40 is mounted in the housing 11 in the path of gas flow. Preferably, the mask 40 is positioned adjacent one surface of the catalytically active screen 15. In the illustrated embodiment, the mask 40 is mounted adjacent the inner surface of the screen 15 and is separated from the catalytically active material and from the ceramic material 17 by thin screens 41 and 42, respectively. The mask may be formed by a sheet of any suitable heat-resistant material, such as asbestos, and is provided with figured holes 43. These holes 43 correspond in number and shape to the card apertures 29, 30 and thus outline each of the mold cavities 33.

In use, the card 25 is placed on the mold 32 so that the apertures 29, 30 are over the cavities 33 and the heater 10 is spaced from the mold so that the holes 43 are also aligned with the cavities. With this arrangement, it will be apparent that the fuel mixture supplied to the manifold is masked by the member 40 so that mixture will be fed to the catalytically active screen 15 only in areas delineating the mold cavities. These areas of the screen may be ignited by a suitable burner temporarily to bring the fuel mixture into its flammable range. In about a minute the screen 15 will heat up to its catalytic ignition temperature and will thereafter burn below the flammable temperature of the fuel mixture only in those areas defined by the figured holes 43.

In this manner heat energy is transmitted both by radiation and by convection to the plastic film 31 only in its pocket-forming areas defined by the card apertures 29, 30. The remainder of the film remains cool so that no lineal stresses as would cause the card to curl are set-up. When the film has been selectively heated and softened in this manner, a vacuum is created in the vacuum manifold 34 to cause the film to be forced into the cavities 33. The plastic is then cooled to set the pockets in their formed shape which have the contour of at least a portion of the product to be packaged. These contoured pockets are free of internal stresses and will retain their shape even if they subsequently become warm.

It will thus be seen that the invention provides an efficient heating mechanism which can be used selectively to heat work areas of any desired configuration. The invention is particularly useful as a heat source in package making apparatus, since it provides a means by which plastic film can be heated and softened only in its pocket-forming areas. However, it will be apparent that the invention can be used to advantage in many other applications requiring selective heating.

Many modifications of the invention also will be apparent to those skilled in the art in view of the foregoing detailed disclosure. Therefore, it is to be understood that, within the scope of the appended claims, the invention can be practiced otherwise than as specifically shown and described.

What is claimed is:

1. A heating mechanism comprising a housing having a wall opening, said housing defining a fuel manifold, catalytically active screen means mounted in said housing, and heat resistant masking member mounted on said housing over said opening, said masking member being spaced from said screen means and having a figured hole so that radiant heat will be supplied by said mechanism in a delineative manner.

2. A heating mechanism comprising a housing having a wall opening, said housing defining a fuel manifold, means for introducing fuel into said manifold, catalytically active screen means mounted in said housing over said opening, and a mask mounted in said housing between said manifold and said screen means, and said mask being spaced from one surface of said screen means and having a figured hole so that fuel is supplied to said screen means in a delineative manner.

3. A heating mechanism comprising a housing having a wall opening, said housing defining a fuel manifold, a refractory fuel diffusing medium between said manifold and said opening, catalytically active screen means disposed outwardly of said medium over said opening, and a heat-resistant mask adjacent one surface of said screen means and spaced therefrom, said mask having a figured hole so that radiant heat is supplied by said mechanism in a delineative manner.

4. The mechanism as claimed in claim 3 wherein said mask is positioned between said screen means and said diffusing medium.

5. In a package forming apparatus including a mold having means for shaping a contoured pocket of flexible material, an improved heating mechanism for selectively heating a sheet of flexible material, said heating mechanism comprising a housing having a wall opening, catalytically active screen means carried by said housing over said opening, means associated with said housing for supplying heat to said screen means and causing combustion on a surface thereof, and a heat resistant mask adjacent one surface of said screen means, said mask having a figured hole conforming to the outline of said shaping means and disposed in alignment therewith so that a sheet of flexible material on said mold will be heated in its pocket-forming area.

6. The apparatus as claimed in claim 5 wherein said mask is disposed adjacent the inner surface of said screen means.

7. In a package forming apparatus including a mold having means for shaping a contoured pocket in a sheet of flexible material, a radiant heating mechanism for selectively heating the sheet of flexible material, said mechanism comprising a housing having a wall opening spaced from said mold, said housing defining a fuel manifold, a sheet of catalytically active material over said opening, a supporting screen holding said catalytically active material in said housing, a heat resistant mask between said manifold and said catalytically active material, said mask having a figured hole conforming to the outline of said shaping means and disposed in alignment therewith so that radiant heat will be applied to the sheet of flexible material only in its pocket-forming area, and a screen between said mask and said catalytically active material.

8. In a package forming apparatus including a mold having as a portion thereof means for shaping a contoured pocket in a sheet of flexible material, the improvement comprising a heating mechanism for selectively heating the flexible sheet of material in its pocket-forming area, said heating mechanism including means for generating heat energy, said generating means having an active area which is exposed to said mold and is figured to conform with the area within the perimeter of the shaping means of said mold, said figured area being spaced from said mold in alignment with said shaping means so that a sheet of flexible material on said mold will be heated only in its pocket forming area.

References Cited by the Examiner

UNITED STATES PATENTS

| | | | |
|---|---|---|---|
| 1,223,308 | 4/1917 | Bone et al. | 158—99 |
| 2,120,328 | 6/1938 | Ferngren | 18—19 X |
| 2,229,613 | 1/1941 | Strauch | 18—19 X |
| 2,311,350 | 2/1943 | Richardson | 158—7 |
| 2,377,946 | 6/1945 | Leary | 18—19 X |
| 2,620,014 | 12/1952 | Lyuynen | 18—19 X |
| 2,749,572 | 6/1956 | Nowak | 264—327 X |
| 2,775,294 | 12/1956 | Schwank | 158—116 |
| 2,936,751 | 5/1960 | Forniti | 126—92 |
| 3,027,936 | 4/1962 | Lamp. | |
| 3,049,795 | 8/1962 | Valyi. | |
| 3,053,023 | 9/1962 | Watts | 53—30 |
| 3,147,960 | 9/1964 | Ruff | 158—99 X |

FOREIGN PATENTS

| | | |
|---|---|---|
| 477,948 | 8/1915 | France. |
| 867,148 | 7/1941 | France. |
| 1,075,372 | 4/1954 | France. |
| 1,108,655 | 9/1955 | France. |

WILLIAM J. STEPHENSON, *Primary Examiner.*

FREDERICK L. MATTESON, JR., H. B. RAMEY, *Assistant Examiners.*